(12) United States Patent
Tidd (10) Patent No.: US 9,465,955 B1
(45) Date of Patent: Oct. 11, 2016

(54) SYSTEM FOR AND METHODS OF CONTROLLING USER ACCESS TO APPLICATIONS AND/OR PROGRAMS OF A COMPUTER

(71) Applicant: hopTo Inc., Campbell, CA (US)

(72) Inventor: William Tidd, Alton Bay, NH (US)

(73) Assignee: HOPTO INC., Campbell, CA (US)

( * ) Notice: Subject to any disclaimer, the term of this patent is extended or adjusted under 35 U.S.C. 154(b) by 0 days.

(21) Appl. No.: 14/332,660

(22) Filed: Jul. 16, 2014

Related U.S. Application Data

(63) Continuation of application No. 13/367,228, filed on Feb. 6, 2012, now Pat. No. 8,863,232.

(60) Provisional application No. 61/439,765, filed on Feb. 4, 2011.

(51) Int. Cl.
*G06F 21/00* (2013.01)
*G06F 21/62* (2013.01)

(52) U.S. Cl.
CPC .................................. *G06F 21/6245* (2013.01)

(58) Field of Classification Search
USPC ............................................................ 726/2
See application file for complete search history.

(56) References Cited

U.S. PATENT DOCUMENTS 5,268,962 A * 12/1993 Abadi ................. H04L 63/1441
380/284
5,809,230 A * 9/1998 Pereira ................ G06F 21/6218
726/35
5,831,609 A 11/1998 London et al.
5,898,419 A 4/1999 Liu
5,978,834 A 11/1999 Simonoff et al.
6,288,702 B1 9/2001 Tachibana
6,393,569 B1 5/2002 Orenshteyn
6,710,790 B1 3/2004 Fagioli
7,051,288 B2 5/2006 Bennett et al.
7,058,461 B2 6/2006 Malizia
7,188,181 B1 3/2007 Squier et al.

(Continued)

FOREIGN PATENT DOCUMENTS

WO WO 2010/135127 11/2010

OTHER PUBLICATIONS

Park et al.; "Role-based access control on the web"; ACM transactions on information and system security; vol. 4, No. 1, Feb. 2001. p. 37-71, 35 pages.

(Continued)

*Primary Examiner* — Jason Lee
(74) *Attorney, Agent, or Firm* — Polsinelli LLP (57) ABSTRACT

A system includes an application access manager driver and an operating system (OS) kernel module in a kernel-mode address space of an OS. The system also includes application modules, a public application whitelist, a public application whitelist manager, a user/group application whitelist, and a user/group application whitelist manager in a user-mode address space of the OS. A method includes receiving a request to launch an application, calling a "create process" function in the OS kernel module, calling a pre-registered "create process" callback function to the application access manager driver, and determining whether the application is allowed to execute based on whether the application access manager driver identifies the application as an allowable process in either public application whitelist or user/group application whitelist.

17 Claims, 6 Drawing Sheets

(56) References Cited

U.S. PATENT DOCUMENTS

| | | |
|---|---|---|
| 7,216,298 B1 | 5/2007 | Ballard et al. |
| 7,222,158 B2 | 5/2007 | Wexelblat |
| 7,249,175 B1 | 7/2007 | Donaldson |
| 7,353,252 B1 | 4/2008 | Yang et al. |
| 7,461,134 B2 | 12/2008 | Ambrose |
| 7,526,792 B2 | 4/2009 | Ross |
| 7,587,459 B2 | 9/2009 | Wewalaarachchi et al. |
| 7,647,411 B1 | 1/2010 | Schiavone et al. |
| 7,716,302 B2 | 5/2010 | Maze et al. |
| 7,739,693 B2 | 6/2010 | Bernhard et al. |
| 7,920,528 B2 | 4/2011 | Karaoguz et al. |
| 8,073,855 B2 | 12/2011 | Nagoya |
| 8,117,554 B1 | 2/2012 | Grechishkin et al. |
| 8,219,807 B1 | 7/2012 | Danoyan et al. |
| 8,281,410 B1* | 10/2012 | Sobel et al. ............. 726/27 |
| 8,427,445 B2 | 4/2013 | Kennedy |
| 8,438,473 B2 | 5/2013 | Mak et al. |
| 8,527,978 B1 | 9/2013 | Sallam |
| 8,688,734 B1 | 4/2014 | Tidd |
| 8,694,507 B2 | 4/2014 | Meyerzon et al. |
| 8,713,658 B1 | 4/2014 | Tidd |
| 8,738,814 B1 | 5/2014 | Cronin |
| 8,739,074 B2 | 5/2014 | Kinoshita |
| 8,745,505 B2 | 6/2014 | Tam |
| 8,769,011 B2 | 7/2014 | Baird et al. |
| 8,799,777 B1 | 8/2014 | Lee |
| 8,856,907 B1 | 10/2014 | Tidd |
| 8,863,232 B1 | 10/2014 | Tidd |
| 8,887,132 B1 | 11/2014 | Hunter |
| 8,950,007 B1 | 2/2015 | Teal et al. |
| 8,954,887 B1 | 2/2015 | Tseng |
| 9,165,160 B1 | 10/2015 | Tidd |
| 9,203,791 B1 | 12/2015 | Olomskiy |
| 9,239,812 B1 | 1/2016 | Berlin |
| 9,398,001 B1 | 7/2016 | Tidd |
| 9,401,909 B2 | 7/2016 | Tidd |
| 2001/0023438 A1 | 9/2001 | Ishida |
| 2002/0091697 A1 | 7/2002 | Huang et al. |
| 2002/0130900 A1 | 9/2002 | Davis |
| 2002/0158921 A1 | 10/2002 | Silverstein |
| 2003/0058277 A1 | 3/2003 | Bowman-Amuah |
| 2003/0084112 A1 | 5/2003 | Curray et al. |
| 2003/0163448 A1 | 8/2003 | Kilemba et al. |
| 2004/0080771 A1 | 4/2004 | Mihira et al. |
| 2004/0163046 A1 | 8/2004 | Chu et al. |
| 2004/0190049 A1 | 9/2004 | Itoh |
| 2005/0044483 A1 | 2/2005 | Maze et al. |
| 2005/0093868 A1 | 5/2005 | Hinckley |
| 2005/0102636 A1 | 5/2005 | McKeon et al. |
| 2005/0114760 A1 | 5/2005 | Arregui et al. |
| 2005/0138569 A1 | 6/2005 | Baxter et al. |
| 2005/0149857 A1 | 7/2005 | Negishi et al. |
| 2005/0177730 A1 | 8/2005 | Davenport et al. |
| 2005/0198299 A1 | 9/2005 | Beck et al. |
| 2005/0210418 A1 | 9/2005 | Marvit et al. |
| 2005/0226192 A1 | 10/2005 | Red et al. |
| 2006/0005187 A1 | 1/2006 | Neil |
| 2006/0010433 A1 | 1/2006 | Neil |
| 2006/0039012 A1 | 2/2006 | Ferlitsch |
| 2006/0047780 A1 | 3/2006 | Patnude |
| 2006/0059253 A1 | 3/2006 | Goodman et al. |
| 2006/0075224 A1 | 4/2006 | Tao |
| 2006/0150256 A1 | 7/2006 | Fanton et al. |
| 2006/0161846 A1 | 7/2006 | Van Leeuwen |
| 2006/0230105 A1 | 10/2006 | Shappir et al. |
| 2006/0250578 A1 | 11/2006 | Pohl et al. |
| 2006/0253558 A1 | 11/2006 | Acree et al. |
| 2007/0061264 A1 | 3/2007 | Yeung et al. |
| 2007/0078994 A1 | 4/2007 | Wilson et al. |
| 2007/0089111 A1 | 4/2007 | Robinson et al. |
| 2007/0101297 A1 | 5/2007 | Forstall et al. |
| 2007/0113187 A1 | 5/2007 | McMullen et al. |
| 2007/0121584 A1 | 5/2007 | Qiu et al. |
| 2007/0174410 A1 | 7/2007 | Croft et al. |
| 2007/0198950 A1 | 8/2007 | Dodge |
| 2007/0280459 A1 | 12/2007 | Yee et al. |
| 2007/0283446 A1 | 12/2007 | Yami et al. |
| 2008/0016504 A1 | 1/2008 | Cheng et al. |
| 2008/0071860 A1 | 3/2008 | Dal Canto et al. |
| 2008/0091550 A1 | 4/2008 | Zacarias et al. |
| 2008/0137131 A1 | 6/2008 | Cavill et al. |
| 2008/0167005 A1 | 7/2008 | Gilzean et al. |
| 2008/0209537 A1 | 8/2008 | Wong et al. |
| 2008/0270516 A1 | 10/2008 | Ragnet et al. |
| 2009/0013045 A1 | 1/2009 | Maes et al. |
| 2009/0013273 A1 | 1/2009 | Fuchs |
| 2009/0021387 A1 | 1/2009 | Hosono |
| 2009/0024626 A1 | 1/2009 | Takei |
| 2009/0027334 A1 | 1/2009 | Foulk et al. |
| 2009/0037976 A1 | 2/2009 | Teo et al. |
| 2009/0070404 A1 | 3/2009 | Mazzaferri |
| 2009/0083852 A1 | 3/2009 | Kuo et al. |
| 2009/0132509 A1 | 5/2009 | Nagoya |
| 2009/0144362 A1 | 6/2009 | Richmond et al. |
| 2009/0177791 A1 | 7/2009 | Edelstein et al. |
| 2009/0180777 A1 | 7/2009 | Bernard et al. |
| 2009/0182501 A1 | 7/2009 | Fyke |
| 2009/0187654 A1 | 7/2009 | Raja et al. |
| 2009/0187857 A1 | 7/2009 | Tanaka |
| 2009/0204711 A1 | 8/2009 | Binyamin |
| 2009/0231285 A1 | 9/2009 | Duncan |
| 2009/0235347 A1 | 9/2009 | Syed et al. |
| 2009/0245176 A1 | 10/2009 | Balasubramanian et al. |
| 2009/0300129 A1 | 12/2009 | Golub |
| 2010/0005142 A1 | 1/2010 | Xiao et al. |
| 2010/0020025 A1 | 1/2010 | Lemort et al. |
| 2010/0058431 A1 | 3/2010 | McCorkendale et al. |
| 2010/0088367 A1 | 4/2010 | Brown et al. |
| 2010/0138780 A1 | 6/2010 | Marano et al. |
| 2010/0146504 A1 | 6/2010 | Tang et al. |
| 2010/0153581 A1 | 6/2010 | Nagarajan et al. |
| 2010/0162163 A1 | 6/2010 | Wang et al. |
| 2010/0214302 A1 | 8/2010 | Melcher et al. |
| 2010/0228963 A1 | 9/2010 | Kassab et al. |
| 2010/0268762 A1 | 10/2010 | Pahlavan et al. |
| 2010/0269039 A1 | 10/2010 | Pahlavan et al. |
| 2010/0269152 A1 | 10/2010 | Pahlavan et al. |
| 2010/0293499 A1 | 11/2010 | Young et al. |
| 2010/0295817 A1 | 11/2010 | Nicholson et al. |
| 2010/0321406 A1 | 12/2010 | Iwase |
| 2010/0325716 A1 | 12/2010 | Hong et al. |
| 2011/0010668 A1 | 1/2011 | Feldstein |
| 2011/0029772 A1 | 2/2011 | Fanton et al. |
| 2011/0099297 A1 | 4/2011 | Hayton |
| 2011/0113427 A1* | 5/2011 | Dotan ............. G06F 9/455 718/1 |
| 2011/0137974 A1 | 6/2011 | Momchilov |
| 2011/0138295 A1 | 6/2011 | Momchilov et al. |
| 2011/0138314 A1 | 6/2011 | Mir et al. |
| 2011/0141031 A1 | 6/2011 | McCullough et al. |
| 2011/0145728 A1 | 6/2011 | Bishop |
| 2011/0154212 A1 | 6/2011 | Gharpure et al. |
| 2011/0191407 A1 | 8/2011 | Fu et al. |
| 2011/0197051 A1 | 8/2011 | Mullin et al. |
| 2011/0209064 A1 | 8/2011 | Jorgensen et al. |
| 2011/0258271 A1 | 10/2011 | Gaquin |
| 2011/0264463 A1 | 10/2011 | Kincaid |
| 2011/0270936 A1 | 11/2011 | Guthrie et al. |
| 2011/0277027 A1 | 11/2011 | Hayton et al. |
| 2011/0279829 A1 | 11/2011 | Chang et al. |
| 2011/0302495 A1 | 12/2011 | Pinto et al. |
| 2011/0307614 A1 | 12/2011 | Bernardi et al. |
| 2011/0314093 A1 | 12/2011 | Sheu et al. |
| 2012/0011472 A1 | 1/2012 | Ohkubo |
| 2012/0011578 A1 | 1/2012 | Hinton et al. |
| 2012/0023593 A1 | 1/2012 | Puder et al. |
| 2012/0030584 A1 | 2/2012 | Bian |
| 2012/0054671 A1 | 3/2012 | Thompson et al. |
| 2012/0066607 A1 | 3/2012 | Song et al. |
| 2012/0066695 A1 | 3/2012 | Berezansky et al. |
| 2012/0066762 A1 | 3/2012 | Todorovic |
| 2012/0084713 A1 | 4/2012 | Desai et al. |
| 2012/0092277 A1 | 4/2012 | Momchilov |
| 2012/0096389 A1 | 4/2012 | Flam et al. |

(56) References Cited

U.S. PATENT DOCUMENTS

| | | |
|---|---|---|
| 2012/0151374 A1 | 6/2012 | Liu |
| 2012/0159482 A1 | 6/2012 | Jeong et al. |
| 2012/0159570 A1* | 6/2012 | Reierson et al. ............ 726/2 |
| 2012/0173673 A1 | 7/2012 | Dietrich et al. |
| 2012/0173732 A1 | 7/2012 | Sullivan |
| 2012/0185527 A1 | 7/2012 | Jaudon et al. |
| 2012/0185767 A1 | 7/2012 | Schlegel |
| 2012/0226742 A1 | 9/2012 | Momchilov et al. |
| 2012/0240054 A1 | 9/2012 | Webber |
| 2012/0246645 A1 | 9/2012 | Iikura et al. |
| 2012/0297471 A1 | 11/2012 | Smithson |
| 2012/0304061 A1 | 11/2012 | Hoover |
| 2012/0304168 A1 | 11/2012 | Raj Seeniraj et al. |
| 2012/0311070 A1 | 12/2012 | BianRosa et al. |
| 2012/0324365 A1 | 12/2012 | Momchilov et al. |
| 2013/0024779 A1 | 1/2013 | Bechtel et al. |
| 2013/0024812 A1 | 1/2013 | Reeves et al. |
| 2013/0060842 A1 | 3/2013 | Grossman et al. |
| 2013/0097550 A1 | 4/2013 | Grossman et al. |
| 2013/0110828 A1 | 5/2013 | Meyerzon et al. |
| 2013/0132856 A1 | 5/2013 | Binyamin et al. |
| 2013/0138810 A1 | 5/2013 | Binyamin et al. |
| 2013/0198600 A1 | 8/2013 | Lockhart et al. |
| 2013/0219338 A1 | 8/2013 | VanBlon |
| 2013/0254675 A1 | 9/2013 | de Andrade et al. |
| 2013/0254761 A1 | 9/2013 | Reddy et al. |
| 2013/0275973 A1 | 10/2013 | Greenfield et al. |
| 2013/0290856 A1 | 10/2013 | Beveridge et al. |
| 2013/0305344 A1 | 11/2013 | Alicherry et al. |
| 2013/0311990 A1 | 11/2013 | Tang et al. |
| 2013/0318582 A1 | 11/2013 | McCann et al. |
| 2013/0326583 A1 | 12/2013 | Freihold et al. |
| 2014/0012574 A1 | 1/2014 | Pasupalak et al. |
| 2014/0026057 A1 | 1/2014 | Kimpton et al. |
| 2014/0032644 A1 | 1/2014 | Saxena et al. |
| 2014/0074881 A1 | 3/2014 | Meyerzon et al. |
| 2014/0143846 A1 | 5/2014 | Tidd |
| 2014/0143847 A1 | 5/2014 | Tidd |
| 2014/0165176 A1 | 6/2014 | Ow |
| 2014/0188977 A1 | 7/2014 | Song et al. |
| 2014/0325054 A1 | 10/2014 | Agrawal et al. |
| 2015/0074199 A1 | 3/2015 | Lv |

OTHER PUBLICATIONS

U.S. Appl. No. 13/367,228 Final Office Action mailed Jul. 23, 2013.
U.S. Appl. No. 13/367,228 Office Action mailed Jan. 30, 2013.
U.S. Appl. No. 13/367,239 Final Office Action mailed Nov. 14, 2013.
U.S. Appl. No. 13/367,239 Office Action mailed Jun. 24, 2013.
U.S. Appl. No. 13/481,742 Final Office Action mailed Sep. 4, 2013.
U.S. Appl. No. 13/481,742 Office Action mailed May 9, 2013.
U.S. Appl. No. 13/481,746 Final Office Action mailed Mar. 26, 2014.
U.S. Appl. No. 13/481,746 Office Action mailed Dec. 19, 2013.
U.S. Appl. No. 13/481,751 Office Action mailed Dec. 30, 2013.
U.S. Appl. No. 13/481,752 Final Office Action mailed Sep. 4, 2013.
U.S. Appl. No. 13/481,752 Office Action mailed May 9, 2013.
U.S. Appl. No. 13/753,474 Office Action mailed Jun. 11, 2014.
U.S. Appl. No. 13/753,474 Final Office Action mailed Mar. 6, 2014.
U.S. Appl. No. 13/753,474 Office Action mailed Nov. 21, 2013.
U.S. Appl. No. 13/570,106 Office Action mailed Feb. 27, 2014.
U.S. Appl. No. 13/570,108 Office Action mailed May 13, 2014.
U.S. Appl. No. 13/570,115 Final Office Action mailed Jun. 30, 2014.
U.S. Appl. No. 13/570,115 Office Action mailed Feb. 11, 2014.
U.S. Appl. No. 13/481,743 Office Action mailed Jan. 14, 2015.
U.S. Appl. No. 13/481,751 Final Office Action mailed Sep. 3, 2014.
U.S. Appl. No. 13/753,474 Final Office Action mailed Oct. 6, 2014.
U.S. Appl. No. 13/570,106 Final Office Action mailed Sep. 15, 2014.
U.S. Appl. No. 13/570,108 Office Action mailed Oct. 10, 2014.
U.S. Appl. No. 13/668,097 Office Action mailed Sep. 12, 2014.
U.S. Appl. No. 13/668,100 Office Action mailed Sep. 10, 2014.
U.S. Appl. No. 13/753,475 Office Action mailed Apr. 24, 2015.
U.S. Appl. No. 13/753,476 Office Action mailed Apr. 22, 2015.
U.S. Appl. No. 13/570,103 Office Action mailed Apr. 24, 2015.
U.S. Appl. No. 13/570,115 Office Action mailed Jun. 19, 2015.
U.S. Appl. No. 13/668,097 Final Office Action mailed Jun. 16, 2015.
U.S. Appl. No. 13/668,100 Final Office Action mailed Jun. 17, 2015.
U.S. Appl. No. 13/481,745 Office Action mailed Feb. 10, 2015.
U.S. Appl. No. 13/753,474 Office Action mailed Mar. 27, 2015.
U.S. Appl. No. 13/570,108 Office Action mailed Apr. 1, 2015.
U.S. Appl. No. 13/570,110 Office Action mailed Mar. 30, 2015.
U.S. Appl. No. 13/570,111 Office Action mailed Apr. 1, 2015.
U.S. Appl. No. 13/570,113 Office Action mailed Apr. 3, 2015.
U.S. Appl. No. 13/481,746 Office Action mailed Sep. 15, 2015.
U.S. Appl. No. 13/481,751 Office Action mailed Sep. 17, 2015.
U.S. Appl. No. 13/753,477 Office Action mailed Jul. 29, 2015.
U.S. Appl. No. 13/753,478 Office Action mailed Aug. 19, 2015.
U.S. Appl. No. 13/753,479 Office Action mailed Aug. 12, 2015.
U.S. Appl. No. 13/668,105 Office Action mailed Jul. 8, 2015.
U.S. Appl. No. 14/150,680 Office Action mailed Mar. 29, 2016.
U.S. Appl. No. 14/150,684 Office Action mailed Apr. 12, 2016.
U.S. Appl. No. 14/151,222 Office Action mailed Mar. 30, 2016.
U.S. Appl. No. 14/152,306 Office Action mailed Mar. 30, 2016.
U.S. Appl. No. 13/753,475 Final Office Action mailed Mar. 3, 2016.
U.S. Appl. No. 13/753,476 Final Office Action mailed Mar. 2, 2015.
U.S. Appl. No. 13/753,478 Final Office Action mailed Mar. 29, 2016.
U.S. Appl. No. 13/753,479 Final Office Action mailed Apr. 18, 2016.
U.S. Appl. No. 13/668,097 Office Action mailed Feb. 25, 2016.
U.S. Appl. No. 13/668,100 Office Action mailed Feb. 26, 2016.
Damien, "How to Switch to Desktop Mode for Your Browser in Honeycomb Tablet [Android]." Oct. 4, 2011, http://www.maketecheasier.com/switch-to-desktop-mode-for-honeycomb-tablet-android/.
Kessler, How to use Safari's new 'Reader', Jun. 9, 2010, http://www.cnet.com/news/how-to-use-safaris-new-reader/.
Mobotap, "Add-on Digest: Desktop Toggle," May 16, 2012, http://dolphin.com/add-on-digest-desktop-toggle/.
Sieber, "5 Must Have Add-Ons for the Dolphin Browser on Your Android Honeycomb Tablet," Oct. 25, 2011, http://www.makeuseof.com/tag/5-addons-dolphin-browser-android-honeycomb-tablet/.
Xue, "Windows 8 How To: 1. Switch Between Metro UI and Desktop Mode," Mar. 7, 2012, http://blogs.msdn.com/b/zxue/archive/2012/03/07win8-howto-1-switch-between-metro-ui-and-desktop.aspx.
U.S. Appl. No. 14/152,303 Office Action mailed Nov. 13, 2015.
U.S. Appl. No. 13/481,745 Final Office Action mailed Nov. 19, 2015.
U.S. Appl. No. 14/445,319 Office Action mailed Dec. 14, 2015.
U.S. Appl. No. 13/570,103 Final Office Action mailed Dec. 31, 2015.
U.S. Appl. No. 13/570,110 Final Office Action mailed Dec. 21, 2015.
U.S. Appl. No. 13/570,111 Final Office Action mailed Dec. 18, 2015.
U.S. Appl. No. 13/570,113 Final Office Action mailed Dec. 18, 2015.
U.S. Appl. No. 13/481,743 Office Action mailed Oct. 23, 2015.
U.S. Appl. No. 13/570,108 Final Office Action mailed Oct. 29, 2015.
U.S. Appl. No. 13/570,115 Final Office Action mailed Jun. 27, 2016.

\* cited by examiner

SYSTEM FOR AND METHODS OF CONTROLLING USER ACCESS TO APPLICATIONS AND/OR PROGRAMS OF A COMPUTER

CROSS-REFERENCE TO RELATED APPLICATIONS

The present application is a continuation and claims the priority benefit of U.S. patent application Ser. No. 13/367,228 filed Feb. 6, 2012, which claims the priority benefit of U.S. provisional application No. 61/439,765 filed Feb. 4, 2011, the disclosures of which are incorporated herein by reference.

BACKGROUND OF THE INVENTION

1. Technical Field

Various inventive embodiments disclosed herein relate generally to computer security applications. In particular, embodiments disclosed herein relate to a system for and methods of controlling user access to applications and/or programs of a computer.

2. Background

In a shared computing environment, multiple users are accessing a common computer, such as a server, either directly or remotely via a network connection. Often in a shared computing environment most of the computer's files, programs, processes, and resources may be accessed or browsed by the users. However, certain files, programs, processes, and resources may be sensitive in nature and it may be desired to restrict users' access. Therefore, security measures are implemented on shared computers that attempt to provide isolation between users and thereby prevent one user from accessing another user's data and/or from performing any unauthorized actions. Currently, computer operating systems provide security features by which an administrator of a shared computer may configure each user (i.e., grant permissions or specify restrictions). However, there may be a great deal of complexity associated with using these security features. Therefore, the process of configuring the security settings of multiple users may be very difficult and time consuming.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

The disclosure provides a system with improved security features for controlling user access to applications and/or programs, and more particularly to limiting or restricting user access to applications and/or programs of a computer. The system of the invention exhibits numerous advantages over existing systems. In various embodiments, the system and associated methods may provide a simple process by which an administrator may specify a list of allowable applications and/or programs. Further, in some embodiments, the system of the invention may be configured such that a data structure of allowable applications and/or programs are more readily available to an operating system kernel module. The system and methods of the invention provide isolation between different users and sessions, such that one user accessing a shared computer cannot access other user's data and/or perform any unauthorized actions.

Figure 1:
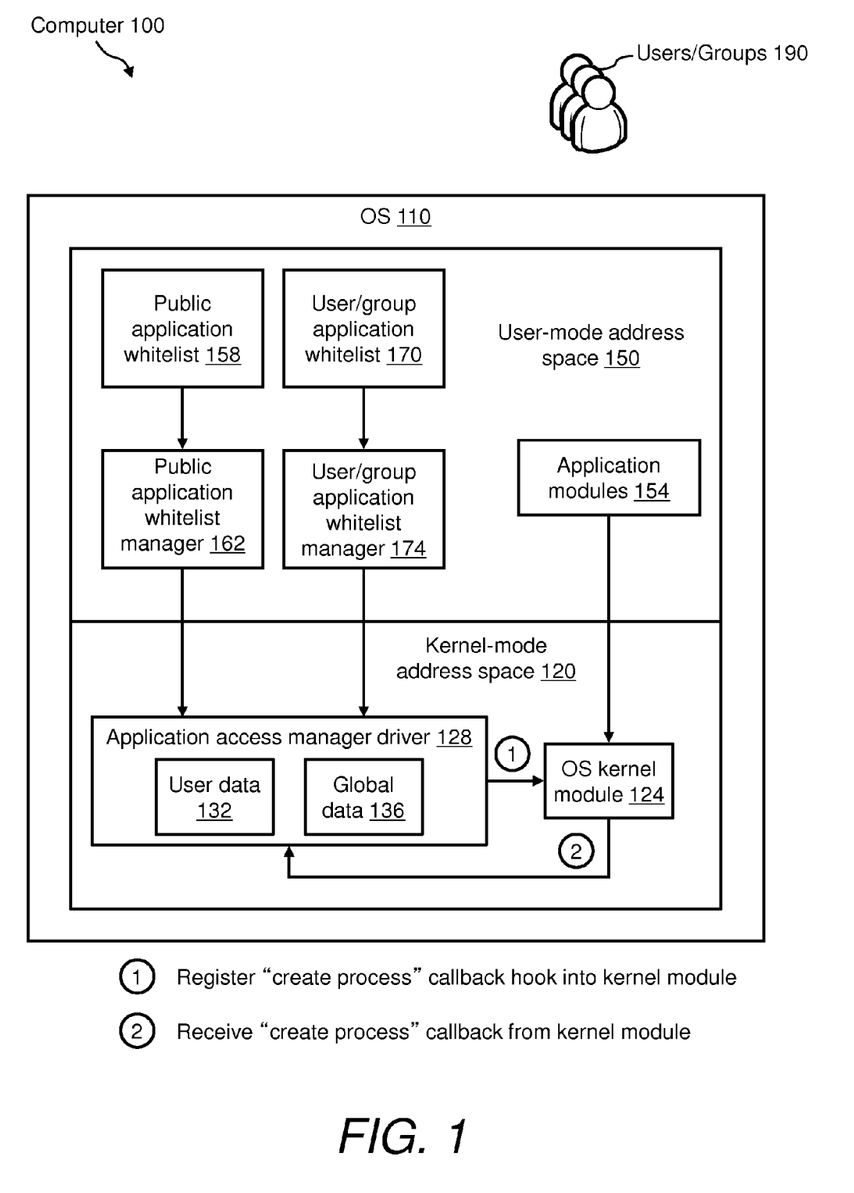
FIG. 1 illustrates a block diagram of a computer that includes security features for controlling user access to applications and/or programs, according to the present disclosure.

FIG. 1 illustrates a block diagram of a computer 100 that includes security features for controlling user access to applications and/or programs, and more particularly to limiting or restricting user access to applications and/or programs of computer 100. Computer 100 includes an operating system (OS) 110 such as Windows® (Microsoft Corporation, Redmond, Wash., USA) or Linux. OS 110 segregates virtual memory into a kernel-mode address space 120 (i.e., kernel space) and a user-mode address space 150 (i.e., user space). In general terms, kernel space is reserved for running an OS kernel, kernel extensions, and most device drivers. In contrast, user space is the memory area in which user mode applications operate.

Although not explicitly shown in FIG. 1, those skilled in the art will recognize that computer 100 includes other components, such as input/output devices (e.g., mouse, keyboard, display, touch screen), primary and/or secondary storage medium or memory, a central processing unit (CPU), a communications bus, a network connection, and the like. Additionally, computer 100 may be accessed by one or more users/groups 190. In one example, computer 100 may be a host computer or centralized server that users/groups 190 may access remotely via a network (not shown). In other example, computer 100 may be a shared public computer that is accessed directly by one or more users/groups 190. In yet another example, computer 100 may be accessed either directly or via a remote connection. In any case, users/groups 190 may be granted access to computer 100 using a login and authentication process.

An operating system (OS) kernel module 124 and an application access manager driver 128 are loaded into kernel-mode address space 120. In embodiments in which OS 110 of computer 100 is the Microsoft Windows OS, OS kernel module 124 may be NTOSKRNL.EXE. Application access manager driver 128 may be implemented in the form of a kernel dynamic link library (DLL) or driver. OS kernel module 124 communicates with application access manager driver 128 using software calls referred to as callbacks, as will be further described herein.

This disclosure may relate to application publishing. The functionality of a server application shall be visible to and accessible by a client via a network. For example, server application may be a computer-aided design (CAD) application, such as AutoCAD (Autodesk, Inc., San Rafael, Calif., USA) or Cadence Virtuoso (Cadence Design Systems, San Jose, Calif.); a medical clinical workflow application such as Symbia.net (Siemens AG, Munich, Germany); an interactive mapping application such as Google Earth (Google, Inc.) or a 3D game. The functionality of the server application shall be visible to and accessible by the client via a network. For example, the functionality of a server application may be accessed from a client using a process herein known as application publishing, which is currently supported by products such as GraphOn GO-Global, Microsoft Remote Desktop Services and Citrix XenApp. Such application publishing may be performed in accordance with teachings of commonly-owned U.S. Pat. No. 5,831,609, filed Jun. 6, 1995, entitled "Method and system for dynamic translation between different graphical user interface systems," which is incorporated by reference as though fully set forth herein.

User-mode address space 150 includes any number of application modules 154, a public application whitelist 158, an public application whitelist manager 162, a user/group application whitelist 170, and a user/group application whitelist manager 174. User/group application whitelist 170 and public application whitelist 158 are maintained in any data storage medium (not shown) of computer 100. The communication path between application modules 154 and OS kernel module 124 signifies that each application module is capable of passing information (e.g., the path to an application module) to OS kernel module 124 during operation. The communication paths from user/group application whitelist 170 to user/group application whitelist manager 174 and from public application whitelist 158 to public application whitelist manager 162 signify that both whitelists can be read from storage and information therein can be provided to application access manager driver 128 during operation.

When a process (parent process) running on computer 100 attempts to start another process (child process) while executing code in an application module 154, a request is sent to kernel address space 120, and more particularly to OS kernel module 124. For example, on Windows computers, when a user double-clicks a Microsoft Word icon on the desktop, the process running the Windows Desktop executable module (i.e., EXPLORER.EXE) executes a number of functions that eventually send a command to the OS kernel module 124 to start a new process running the Microsoft Word executable module (WINWORD.EXE). In this example, the process running EXPLORER.EXE is the parent process and the new process running WINWORD.EXE is the child process. By way of useful background, Windows Explorer is a Windows GUI shell that lets a user examine hard drives, folders, and files of computer 100.

When application access manager driver 128 receives notification of a request to run an application or process. Application access manager driver 128 processes the request and either allows the process to run or denies the request. That is, as access to a certain application is requested, application access manager driver 128 performs an application filtering function according to the invention. In this way, application access manager driver 128 is used to enforce access restrictions on the applications of computer 100.

Public application whitelist 158 is a resource (e.g., a file or files) for storing a list of applications that may be run by all users/groups 190 on computer 100. Such a resource is referred to in the art as a centralized whitelist. The contents of public application whitelist 158 are set up by an administrator.

Public application whitelist manager 162 starts when computer 100 boots up. Public application whitelist manager 162 is responsible for communicating public application whitelist 158 to application access manager driver 128 to be stored in global data 136 at application access manager driver 128, which can be accessed from any process. Public application whitelist manager 162 reads public application whitelist 158 from storage, adds to the whitelist any applications that an administrator has published to all users/groups 190, and then sends the whitelist to application access manager driver 128. As such, the act of publishing an application automatically grants all users/groups 190 rights to that application. Public application whitelist manager 162 sends public application whitelist 158 to application access manager driver 128 directly via a method that allows user-mode modules to send messages to kernel mode modules (drivers). On Windows computers this may be done using an IO Control.

User/group application whitelist 170 is a resource (e.g., a file or files) for storing a list of programs that are allowed to run on computer 100 by a specific user or group 190. User/group application whitelist 170 may include an association between programs and users or groups. It is further expressly contemplated that user/group application whitelist 170 may instead be a blacklist; that is, a resource storing only those programs that are not allowed to be run by each user or group 190. The contents of user/group application whitelist 170 are set up by an administrator. The administrator may make manual entries to user/group application whitelist 170 and/or automatically enable a user access to programs that an administrator has published to a user or group (e.g., programs that are referenced by shortcuts included in the user's profile.

User/group application whitelist manager 174 may be the program that manages initialization of the user's environment. User/group application whitelist manager 174 loads user/group application whitelist 170 from storage, adds to the whitelist programs that are published to the user (or groups to which the user belongs), and sends user/group application whitelist 170 to application access manager driver 128 to be stored in user data 132. Public application whitelist 158 can be edited by public application whitelist manager 162 or by the logon process at user/group application whitelist manager 174. By contrast, the user/group application whitelist 170 can only be edited by the logon process at user/group application whitelist manager 174. For the purposes of the invention, public application whitelist manager 162 and user/group application whitelist manager 174 may be implemented as separate processes or as a single process.

Figure 2:
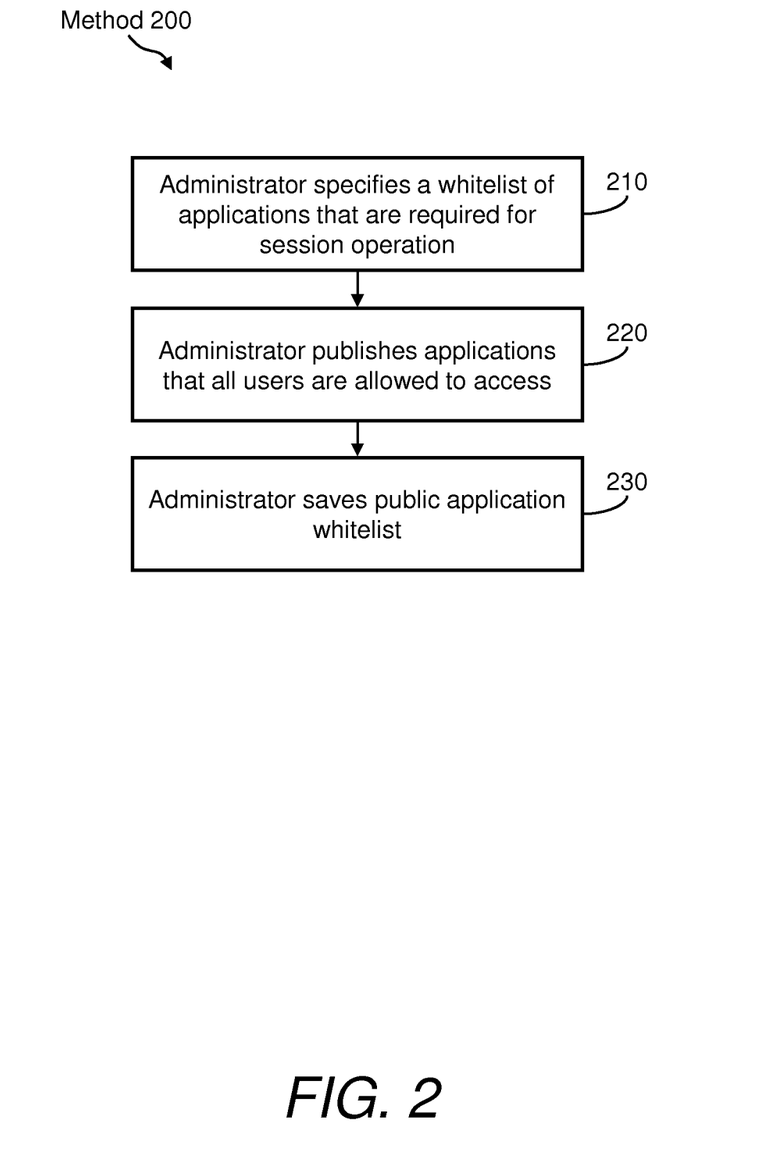
FIG. 2 illustrates a flow diagram of a method of defining public access to computer applications and/or programs, according to the present disclosure.

FIG. 2 illustrates a flow diagram of a method 200 of defining public access to applications and/or programs of computer 100, and more particularly of defining public application whitelist 158. Method 200 may include, but is not limited to, the following steps.

At step 210, an administrator (or other user with similar rights) uses an input device (not shown) of computer 100 to enter information regarding applications and/or programs that are required for users/groups 190 to access computer 100 and run the programs that are published to the user. On Windows computers, an example of one such program is ctfmon.exe, a Windows program that manages keyboard layouts.

At step 220, the administrator uses an input device (not shown) of computer 100 to enter information regarding applications and/or programs that may be invoked by all users/groups 190 of computer 100. That is, in the process of configuring computer 100, the administrator publishes a set of applications to all users/groups 190. For example, an administrator may publish Microsoft Word® by creating a shortcut to Microsoft Word® in the Public\Desktop folder of computer 100. The act of publishing an application to all users/groups 190 automatically grants all users/groups 190 rights to that application, as described in step 450 of method 400 of FIG. 4.

Step 220 provides a benefit over conventional systems in which there is no connection between the process of publishing applications to a user and restricting the user from running applications that are not published. For example, administrators can publish applications to users on Windows computers using Group Policy Preferences and grant/deny users access to applications using Group Policy. With these methods, however, administrators must publish the applications and then separately perform manual steps to grant the user the right to run the published applications and restrict the user from running applications that are not published. In step 220, administrators must only publish the applications; the system then automatically grants the user access to the published applications and denies the user access to all other applications that are not in public application whitelist 158.

At step 230, the administrator saves the set of processes defined at step 210 in the form of public application whitelist 158 to storage medium (not shown) of computer 100. Optionally, the administrator may also save the list of published applications defined at step 220 in public application whitelist 158 to storage medium of computer 100, but in order to avoid data duplication, published applications are typically added to public application whitelist 158 at step 450 of method 400 of FIG. 4. In one example, public application whitelist 158 is stored as an XML file in a default system directory to which all users are granted read access but only administrators are granted write access.

Figure 3:
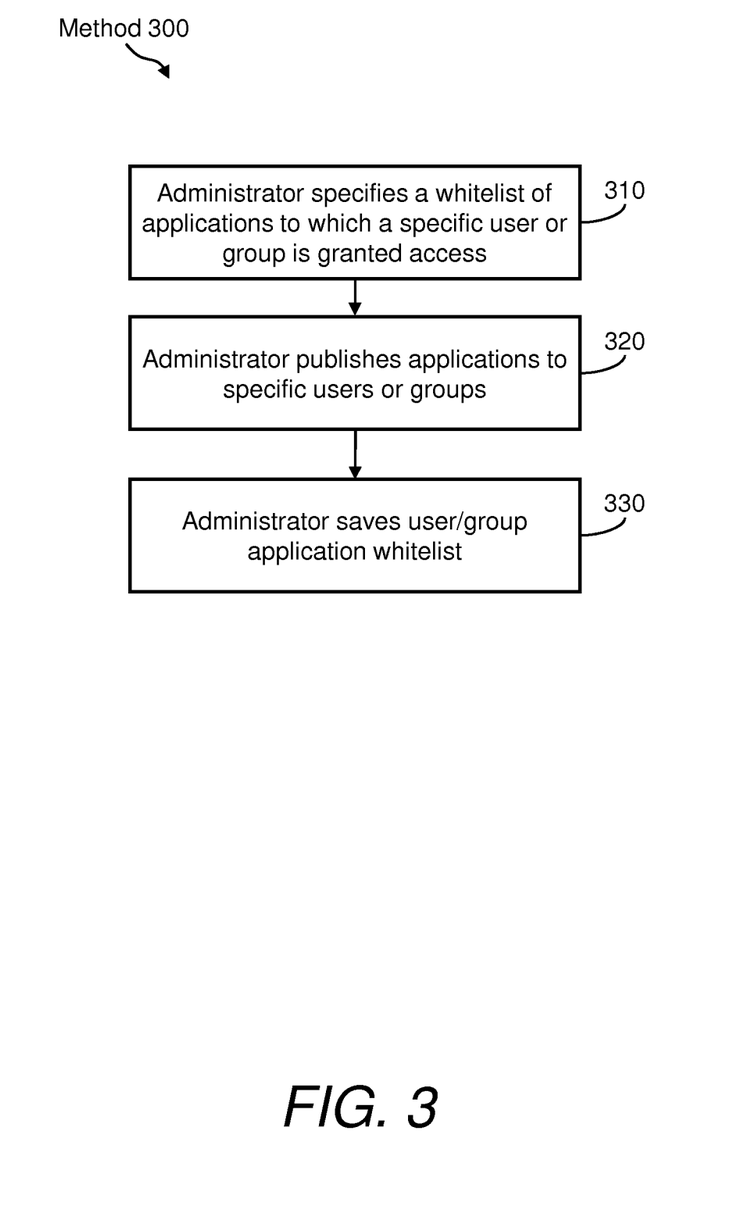
FIG. 3 illustrates a flow diagram of a method of defining user-specific and group-specific access to computer programs, according to the present disclosure.

FIG. 3 illustrates a flow diagram of a method 300 of defining user-specific and group-specific access to programs of computer 100, and more particularly of defining user/group application whitelist 170. Method 300 may include, but is not limited to, the following steps.

At step 310, an administrator (or other user with similar rights) uses an input device (not shown) of computer 100 to enter information regarding the programs of computer 100 that specific users or groups are allowed to run. In one example, the administrator generates a user-specific or group-specific whitelist for each user or group 190. In another example, the administrator generates one whitelist in which each program entry includes a list of the users and groups 190 that are allowed to access the program.

At step 320, which may be in addition to or in place of step 310, the administrator publishes applications to specific users or groups 190. For example, on a Windows computer, an administrator may publish Microsoft Word® to a specific group of users using Group Policy Preferences. Like step 220 of method 200 of FIG. 2, the act of publishing the application automatically grants specific users 190 and/or specific groups 190 rights to that application. As such, step 320 provides a benefit over conventional systems in which there is no connection between the process of publishing applications to a user or group and automatically granting the user of group rights to run the applications. This process is managed by user/group application whitelist manager 174 at step 530 of method 500 of FIG. 5. Again, current methods use group policy to enforce process restrictions, in which an administrator must publish the applications and then separately perform manual steps to grant the user rights to certain applications and/or to restrict the user from running applications.

In one example, the administrator specifies an application path and executable name for each allowable program. In another example, a directory can be specified and all programs within the directory (and, if present, subdirectories of the directory) can be considered allowable programs. In yet another example, the administrator can specify that a hash code be generated and used to identify each allowable program. Hash codes may be derived using any conventional or novel hashing process known to one of skill.

At step 330, the administrator saves the allowable processes in the form of user/group application whitelist 170 to storage medium (not shown) of computer 100. In one example, each user/group application whitelist 170 is stored in an XML file in a user-specific or group-specific directory. Further, this file or directory can have read-only access properties for users or groups 190. The properties are enforced by OS 110 and prevent unauthorized modifications of user allowable processes.

Figure 4:
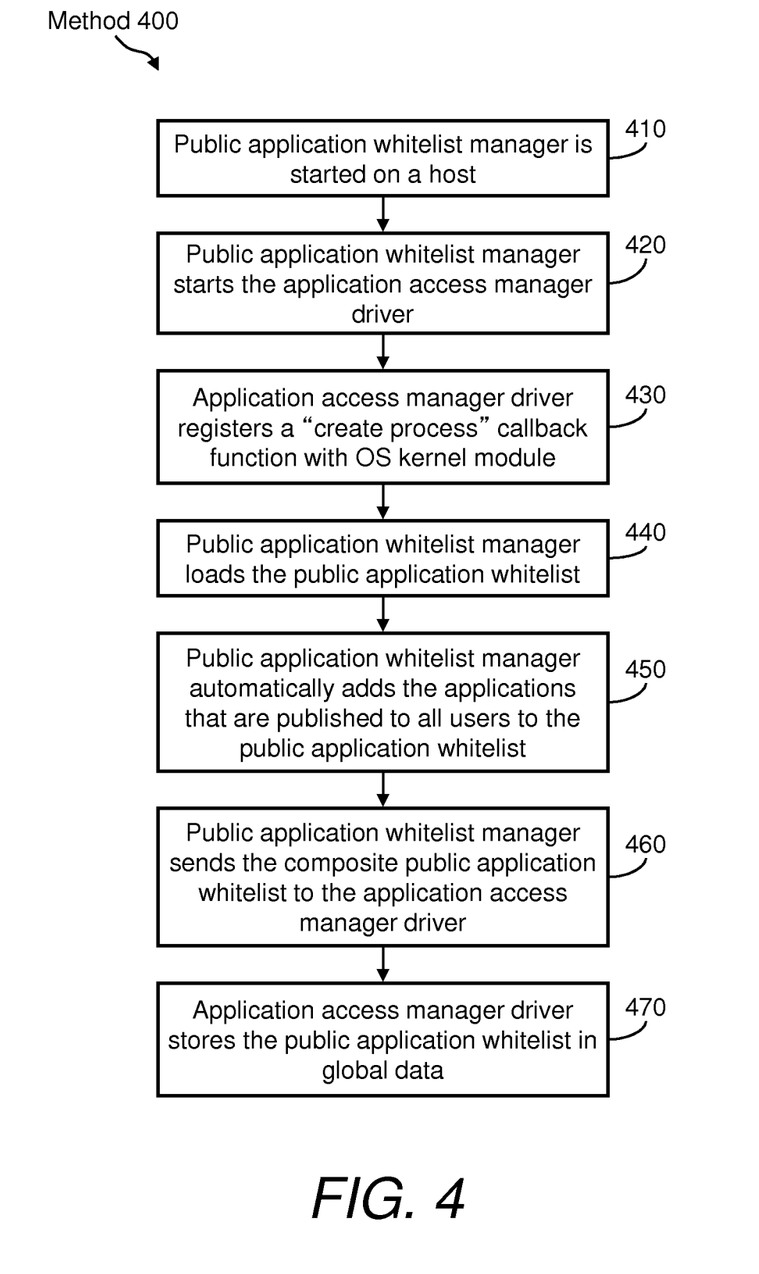
FIG. 4 illustrates a flow diagram of a method of initializing public access to computer programs, according to the present disclosure.

FIG. 4 illustrates a flow diagram of a method 400 of initializing public access to programs of computer 100, and more particularly of passing public application whitelist 158 to application access manager driver 128. Method 400 may include, but is not limited to, the following steps.

At step 410, public application whitelist manager 162 is started on computer 100. In one example, public application whitelist manager 162 is started during the startup process of OS 110. Note that startup typically occurs prior to user authentication.

At step 420, public application whitelist manager 162 loads and initializes application access manager driver 128 if application access manager driver 128 is not already running (e.g., if application access manager driver 128 is not configured to load when OS 110 boots).

At step 430, application access manager driver 128 registers a "create process" callback function with OS kernel module 124. This involves passing a reference to a function of application access manager driver 128 to kernel module 124 that meets OS 110's requirements for "create process" callback functions. These requirements may include calling convention and parameter requirements.

At step 440, public application whitelist manager 162 loads public application whitelist 158 from storage medium (not shown) into primary memory (not shown) of computer 100.

At step 450, based on applications that are published in step 220 of method 200 of FIG. 2, public application whitelist manager 162 automatically adds the applications that are published to all users to the contents of public application whitelist 158. For example, on Windows computers, the list of published applications may be obtained by searching directories within the user's user profile for shortcuts to applications.

At step 460, public application whitelist manager 162 transmits the composite public application whitelist 158 to application access manager driver 128. In so doing, the list of public allowable programs crosses over from user-mode address space 150 to kernel-mode address space 120.

At step 470, application access manager driver 128 stores public application whitelist 158 in global data 136 of application access manager driver 128.

The benefits of performing method 400 of FIG. 4 include (1) bringing public application whitelist 158 into kernel space, where it may be accessed with high efficiency during user-specific program access enforcement methods and (2) creating a communication path from OS kernel module 124 to application access manager driver 128 that can be used to enforce the program restrictions defined in public application whitelist 158.

Figure 5:
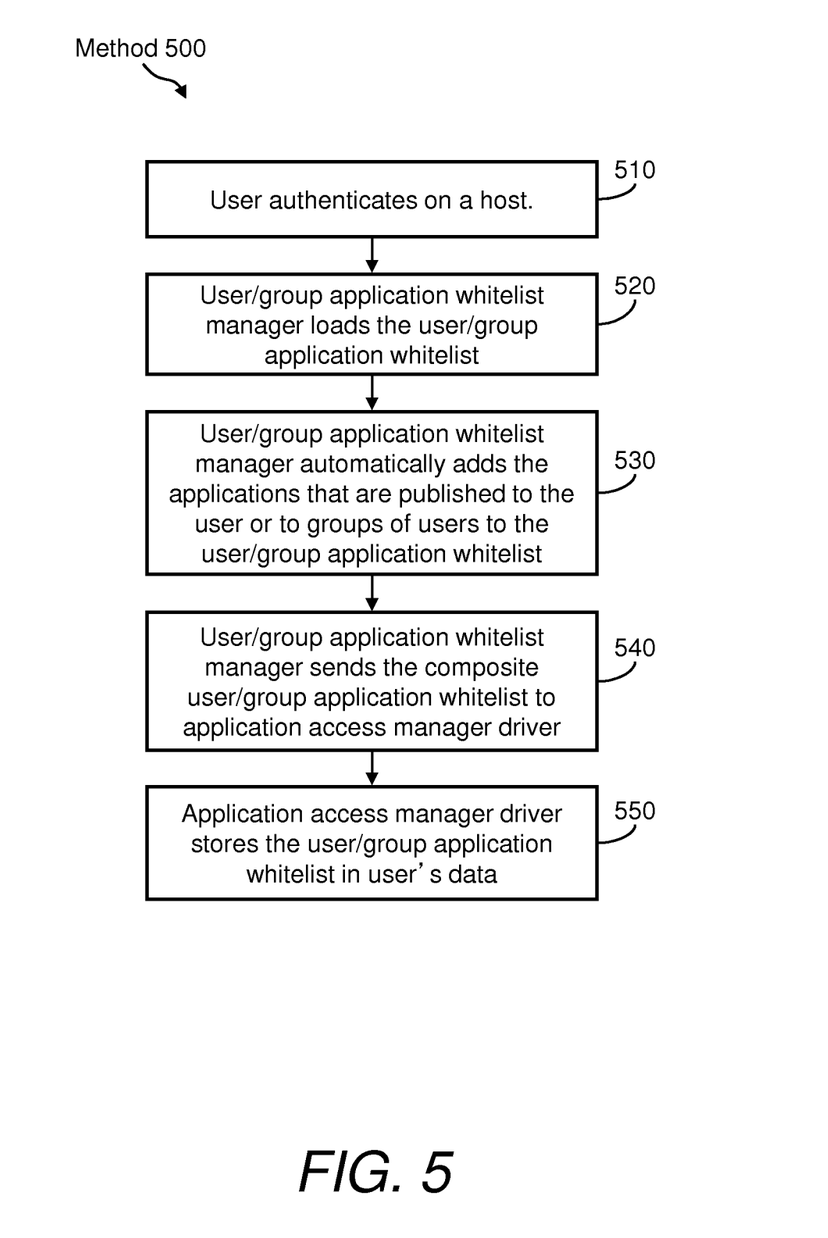
FIG. 5 illustrates a flow diagram of a method of initializing user-specific and group-specific access to computer programs, according to the present disclosure.

FIG. 5 illustrates a flow diagram of a method 500 of initializing user-specific and group-specific access to programs of computer 100, and more particularly of passing user/group application whitelist 170 to application access manager driver 128. Method 500 may include, but is not limited to, the following steps.

At step 510, a certain user 190 is authenticated with computer 100. This step may include a username and password check or other type of conventional or novel authentication known to one of skill. This step generally assumes that the list of allowable users has been predetermined for computer 100 and is accessible from storage.

At step 520, user/group application whitelist manager 174 reads into memory (not shown) of computer 100 the list of allowable programs contained in user/group application whitelist 170 that are associated with the authenticated user 190 and any groups of which the user belongs. The allowable programs may be read from a file into a data structure that can be quickly searched, such as an array list.

At step 530, based on applications that are published in step 310 of method 300 of FIG. 3, user/group application whitelist manager 174 automatically adds any applications that are published to the authenticated user 190 to the contents of user/group application whitelist 170. This also includes automatically adding applications that are published to any groups of which the authenticated user 190 is a member. For example, on Windows computers, the list of published applications may be obtained by searching directories within the user's user profile for shortcuts to applications.

At step 540, user/group application whitelist manager 174 transmits the composite user/group application whitelist 170, which contains the user-specific list of allowable programs, to application access manager driver 128. Thus, the user/group list of allowable programs exists in kernel-mode address space 120.

At step 550, application access manager driver 128 stores user/group application access whitelist 170 in user data 132 of the authenticated user 190. User data 132 resides at application access manager driver 128.

The benefits of initialization method 500 include bringing user/group application whitelist 170 into kernel-mode address space 120, where it can be accessed with high efficiency during user-specific application access enforcement methods.

Figure 6:
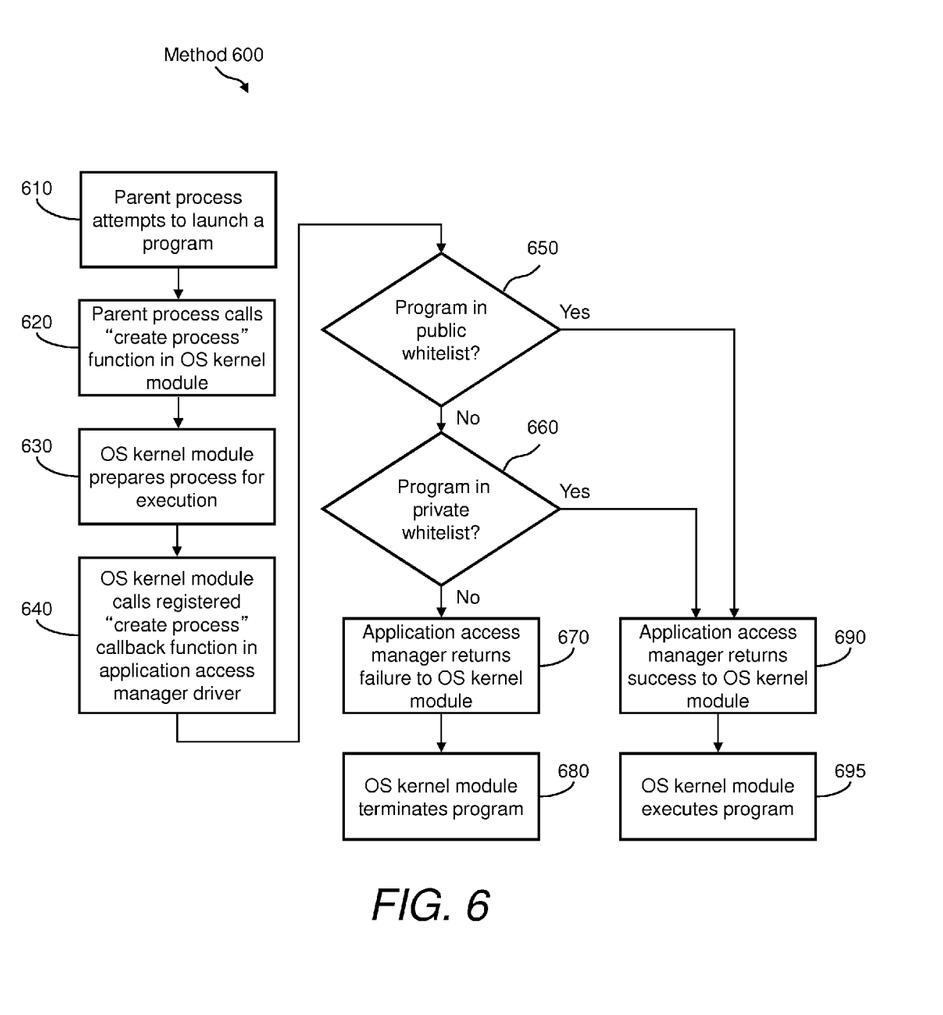
FIG. 6 illustrates a flow diagram of a method of enforcing access restrictions to computer applications and/or programs, according to the present disclosure.

FIG. 6 illustrates a flow diagram of a method 600 of enforcing access restrictions to applications and/or programs of computer 100. More particularly, method 600 is an example of a method of controlling user access to applications and/or programs of a computer. Method 600 may include, but is not limited to, the following steps.

At step 610, any process (parent process) executing application modules 154 attempts to launch a program of computer 100 and thereby create a child process. For example, the child process may be executing a word processing program such as Microsoft Word®, which is WINWORD.EXE, and the parent process of Microsoft Word® may be Windows Explorer, which is EXPLORER. EXE.

At step 620, parent process executing a specific application module 154 calls a "create process" function of OS kernel module 124. The "create process" function requests that OS kernel module 124 create a process and execute a specific application module 154.

At step 630, OS kernel module 124 prepares the process for execution. For example, OS kernel module 124 may set up an address space for the process, load the file containing the specific application module 154's code into memory, and/or set up a stack for the process.

At step 640, before starting the process, OS kernel module 124 calls application access manager driver 128's "create process" callback function, which was registered with OS kernel module 124 at step 430 of method 400 of FIG. 4.

At decision step 650, application access manager driver 128 determines whether the invoked program is present in public application whitelist 158. For example, application access manager driver 128 interrogates the contents of public application whitelist 158 for the requested program. If the program is present, method 600 proceeds to step 690. If the program is not present, method 600 proceeds to decision step 660.

At decision step 660, application access manager driver 128 determines whether the invoked program is present in user/group application whitelist 170. For example, application access manager driver 128 interrogates the contents of user/group application whitelist 170 for the requested program. If the program is present, method 600 proceeds to step 690. If the program is not present, method 600 proceeds to step 670.

According to one embodiment, public application whitelist 158 and user/group application whitelist 170 are both stored in kernel space memory. Decision steps 650 and 660 may include iterating through entries in both whitelists and, for each allowable process entry, checking as to whether the application matches the entry. In embodiments in which the list of allowable processes is stored in any one of a plurality of formats (e.g., a file name, a directory name, a hash), checking may include a format-specific step, such as comparing file name strings, iterating through a directory and comparing file name strings found therein, and/or calculating a file hash. The iteration may return a Boolean true if the allowable process is found, otherwise returning false.

At step 670, having determined that the invoked program is not present in any whitelist, application access manager driver 128 returns a failure indication to OS kernel module 124.

At step 680, OS kernel module 124 terminates the invoked program, which may include unloading any executable modules of application modules 154 that were prepared at step 630.

At step 690, having determined that the invoked program is in either the public application whitelist 158 or user/group application whitelist 170, application access manager driver 128 returns a success indication to OS kernel module 124.

At step 695, OS kernel module 124 starts the program, which may include starting an initial thread of the process that was prepared at step 630.

What is claimed is:

1. A method for controlling user access to applications, the method comprising:
    setting up a kernel-mode address space in memory;
    identifying that a user is authorized to access the requested application when the user is a member of a select group of users by a hardware processor executing instructions out of the kernel-mode address space setup in the memory;
    receiving a list of required applications that the select group of users are allowed to access from a file, the list of required applications including information that associates one or more users of the select group of users with the required applications, and the file is stored in a user-mode address space;

storing the information that associates the one or more users of the select group of users with the required applications in a data structure in the kernel-mode address space accessible by a hardware processor when executing program code of an operating system kernel, publishing the required applications to the select group of users by creating one or more shortcuts that identify the required applications;

receiving a request to access an application of the required applications from a computer operated by the user of the select group of users over a network interface;

identifying that the user of the select group of users is authorized to access the requested application when the requested application is in the list of required applications, wherein the identifying that the user of the select group of users is authorized to access the requested application includes the hardware processor executing the program code of the operating system kernel to search the data structure stored in the kernel-mode address space;

accessing the requested application according to a shortcut of the one or more shortcuts, wherein the shortcut of the one or more shortcuts identifies a folder where the requested application resides, the requested application is accessed by the hardware processor executing the program code of the operating system kernel to access an application module stored in the user-mode address space, the user-mode address space is accessible to the required applications, and the application module includes program code that is associated with the requested application; and providing access to data associated with the requested application to the computer operated by the authorized user over the network interface.

2. The method of claim 1, further comprising:

receiving an input from a system administrator identifying a new application to add to the list of required applications that the select group of users are allowed to access;

creating a new shortcut that identifies a folder where the new application resides;

receiving a request from another user of the select group of users to access the new application from a computer of the another user of the select group of users;

identifying that the another user of the select group of users is authorized to access the requested application;

accessing the new application according to the new shortcut; and providing access to data associated with the new application to the computer of the another user of the select group of users.

3. The method of claim 2, wherein the creating of the new shortcut allows all users of the select user group access to the new application.

4. The method of claim 1, further comprising denying access to an application that is not in the list of required applications.

5. The method of claim 1, wherein the list of required applications is stored in a group specific directory.

6. The method of claim 1, further comprising receiving authentication information input by the user of the select group of users from the computer associated with the user of the select group of users before identifying that the user of the select group of users is authorized to access the requested application.

7. A non-transitory computer readable storage medium having embodied thereon a program executable by a hardware processor to perform a method for controlling user access to applications, the method comprising:

setting up a kernel-mode address space in memory;

identifying that a user is authorized to access the requested application when the user is a member of a select group of users by a hardware processor executing instructions out of the kernel-mode address space setup in the memory;

receiving a list of required applications that the select group of users are allowed to access from a file, the list of required applications including information that associates one or more users of the select group of users with the required applications, and the file is stored in a user-mode address space;

storing the information that associates the one or more users of the select group of users with the required applications in a data structure in the kernel-mode address space accessible by the hardware processor when executing program code of an operating system kernel, publishing the required applications to the select group of users by creating one or more shortcuts that identify the required applications;

receiving a request to access an application of the required applications from a computer operated by the user of the select group of users over a network interface;

identifying that the user of the select group of users is authorized to access the requested application when the requested application is in the list of required applications, wherein the identifying that the user of the select group of users is authorized to access the requested application includes the hardware processor executing the program code of the operating system kernel to search the data structure stored in the kernel-mode address space;

accessing the requested application according to a shortcut of the one or more shortcuts, wherein the shortcut of the one or more shortcuts identifies a folder where the requested application resides, the requested application is accessed by the hardware processor executing the program code of the operating system kernel to access an application module stored in the user-mode address space, the user-mode address space is accessible to the required, and the application module includes program code that is associated with the requested application; and providing access to data associated with the requested application to the computer operated by the authorized user over the network interface.

8. The non-transitory computer readable storage medium of claim 7, the program further executable to:

receive an input from a system administrator identifying a new application to add to the list of required applications that the select group of users are allowed to access;

create a new shortcut of the one or more shortcuts that identifies a folder where the new application resides;

receive a request from another user of the select group of users to access the new application from a computer of the another user of the select group of users;

identify that the another user of the select group of users is authorized to access the requested application;

access the new application according to the new shortcut; and provide access to data associated with the new application to the computer of the another user of the select group of users.

9. The non-transitory computer readable storage medium of claim 8, wherein the creating of the new shortcut allows all users of the select user group access to the new application.

10. The non-transitory computer readable storage medium of claim 7, the program further executable to deny access to an application that is not in the list of required applications.

11. The non-transitory computer readable storage medium of claim 7, wherein the list of required applications is stored in a group specific directory.

12. The non-transitory computer readable storage medium of claim 7, the program further executable to receive authentication information input by the user of the select group of users from the computer associated with the user of the select group of users before identifying that the user of the select group of users is authorized to access the requested application.

13. An apparatus for controlling user access to applications, the apparatus comprising:
a user-mode data store that stores a file that includes a list of required applications that a select group of users are allowed to access, the list of required applications including information that associates one or more users of the select group of users with the required applications, and the file is stored in a user-mode address space;
a memory;
a hardware processor, wherein the hardware processor executing instructions out of the memory:
sets up a kernel mode address space in the memory,
identifies a user as being authorized to access the requested application when the user is a member of the select group of users by the hardware processor executing instructions out of the kernel mode memory address space setup in the memory,
stores the information that associates the one or more users of the select group of users with the required applications in a data structure in the kernel-mode address space accessible by the hardware processor when executing program code of an operating system kernel,
publishes the required applications to the select group of users by creating one or more shortcuts that identify the required applications; and
a network interface that receives a request to access an application of the required applications from a computer operated by a user of the select group of users, wherein the hardware processor executing instructions out of the memory:
identifies that the user of the select group of users is authorized to access the requested application when the requested application is in the list of required applications, wherein the identifying that the user of the select group of users is authorized to access the requested application includes the hardware processor executing the program code of the operating system kernel to search the data structure stored in the kernel-mode address space,
accesses the requested application according to a shortcut of the one or more shortcuts, the shortcut of the one or more shortcuts identifies a folder where the requested application resides, wherein the requested application is accessed by the hardware processor executing the program code of the operating system kernel to access an application module stored in the user-mode address space, and the application module includes program code that is associated with the requested application, the user-mode address space is accessible to the required applications, and
provides access to data associated with the requested application to the computer operated by the authorized user, the data provided over the network interface to the computer operated by the user.

14. The apparatus of claim 13, further comprising an input device, wherein:
the input device receives an input from a system administrator identifying a new application to add to the list of required applications that the select group of users are allowed to access, and
the hardware processor executing instructions out of the memory creates a new shortcut that identifies a folder where the new application resides,
the network interface receives a request from another user of the select group of users to access the new application from a computer of the another user of the select group of users, and the hardware processor executing instructions out of the memory:
identifies that the another user of the select group of users is authorized to access the requested application,
accesses the new application according to the new shortcut, and
provides access to data associated with the new application to another computer operated by the another user of the select group of users, the data associated with the new application is provided over the network interface to the another computer operated by the another user of the select group of users.

15. The apparatus of claim 14, wherein the creating of the new shortcut allows all users of the select user group access to the new application.

16. The apparatus of claim 13, wherein access to an application that is not in the list of required applications is denied.

17. The apparatus of claim 13, wherein the list of required applications is stored in a group specific directory.

* * * * *